(12) United States Patent
Rafalski

(10) Patent No.: US 6,209,850 B1
(45) Date of Patent: Apr. 3, 2001

(54) DAMPER MOUNTING ASSEMBLY

(75) Inventor: Edward F. Rafalski, North Huntingdon, PA (US)

(73) Assignee: Ductmate Industries, Inc., East Monongahela, PA (US)

( * ) Notice: Subject to any disclaimer, the term of this patent is extended or adjusted under 35 U.S.C. 154(b) by 0 days.

(21) Appl. No.: 09/421,631

(22) Filed: Oct. 19, 1999

(51) Int. Cl.⁷ .................................................... F16K 1/22
(52) U.S. Cl. ............................................................ 251/308
(58) Field of Search .................................... 251/308, 305

(56) References Cited

U.S. PATENT DOCUMENTS

| | | | |
|---|---|---|---|
| 131,591 | * 9/1872 | Ball | 251/308 |
| 2,772,850 | * 12/1956 | Eaton | 251/308 |
| 4,503,755 | * 3/1985 | Nordquist et al. | 251/308 |
| 4,715,581 | * 12/1987 | Myers | 251/308 |
| 5,356,116 | * 10/1994 | Morgan et al. | 251/308 |

* cited by examiner

Primary Examiner—Kevin Shaver
Assistant Examiner—David A. Bonderer
(74) Attorney, Agent, or Firm—George Raynovich, Jr.

(57) ABSTRACT

A damper mounting assembly for mounting a damper within an HVAC duct is provided. A damper mounting assembly has attachment clips secured to the damper blade before the damper blade is positioned within the duct. Shaft segments are inserted from outside the duct through axially aligned holes in the duct and are permanently received within the attachment clips affixed to the damper blade to provide support and control for the damper blade within the duct. A damper control handle is affixed to one of the shaft segments so that the position of the damper blade within the duct may be adjusted and thereafter locked in place.

15 Claims, 4 Drawing Sheets

DAMPER MOUNTING ASSEMBLY

BACKGROUND OF THE INVENTION

1. Field of the Invention

This invention relates to a mounting assembly for mounting a volume damper within an air duct system to adjust the flow of air in the system.

2. Description of the Prior Art

In modern heating, ventilating and air conditioning (HVAC) systems, sheet metal duct work is utilized to convey conditioned air throughout buildings. Conventionally, manual volume dampers are positioned at various points throughout the duct work to adjust the flow of air in various sections of the HVAC system. There are presently available a range of low cost hardware options to mount the dampers within the HVAC system. The hardware is adequate for positioning the damper within the duct. However, the current hardware is typically not effective for sealing the holes in the duct that are formed to receive the hardware that holds the damper blade within the duct. Typically, there are air spaces around the shafts which hold the damper blade in place which permits air to leak through the spaces and reduce the efficiency of the duct system. Some examples of earlier damper hardware are shown in U.S. Pat. No. 4,022,241; U.S. Pat. No. 4,372,627; U.S. Pat. No. 4,715,581; and U.S. Pat. No. 4,949,625.

The present invention is directed to damper hardware which permits a round insert to project through a round hole within the duct to minimize pressure loss from the duct. The snap-in feature of the present invention enables the close fitting round shaft to substantially fill the round hole in the duct that receives the damper shaft. A cup washer is utilized for fixing the damper in place once it has been adjusted to the desired angle by tightening a lock nut against the handle that abuts the cup washer.

SUMMARY OF THE INVENTION

The damper mounting assembly of the present invention includes two attachment clips that are arranged to be affixed to axially opposite sides of a damper blade. Each of the attachment clips has a shaft-receiving opening to permanently receive a shaft segment that supports the damper blade within the duct. First and second shaft segments that each have an interior end that permanently mates with one of the attachment clips shaft receiving openings are provided. The first and second shaft segments each have a cylindrical portion that extends through the wall of the duct. The first shaft segment has a control handle receiving portion for attaching a control handle that controls the position of the damper blade within the duct. The second shaft segment has a head larger than the shaft segment cylindrical portion so that the head remains outside the duct.

The present invention further provides a combination of a circular damper blade and a damper mounting assembly for rotatively mounting the circular damper blade in a duct having a circular cross section. The combination includes a circular damper blade that has two attachment clips secured to axially opposite sides of the damper blade. The attachment clips each have four-sided shaft receiving openings that have a snap-in tongue extending into the shaft receiving openings to permanently receive a shaft segment that rotatively supports the damper blade within the duct. First and second shaft segments are provided that each have an interior rectangular end portion that has a groove in the end portion to receive the snap-in tongue to permanently secure the shaft segment to its respective attachment clip once the shaft segment rectangular end portion is inserted into the attachment clip four-sided shaft receiving opening. The first and second shaft segments each have a cylindrical portion that extends through circular holes formed in the axially opposite positions in the duct. The first shaft segment has a flattened threaded portion extending axially outwardly from the cylindrical portion to receive a control handle for controlling the position of the damper blade within the duct. The second shaft segment has a head larger than a shaft segment cylindrical portion that remains outside the duct.

Accordingly, an object of the present invention is to provide relatively inexpensive hardware for positioning a damper blade within a duct that does not degrade the efficiency of the duct.

Another object of the present invention is to provide a combination of a damper and a mounting assembly which is easily assembled by inserting shaft segments from outside the duct to register with the attachment clips which have already been secured to the damper blade.

These and other objects of the present invention will be more completely disclosed and described in the following specification, the accompanying drawings and the appended claims.

DESCRIPTION OF THE PREFERRED EMBODIMENT

Figure 1:
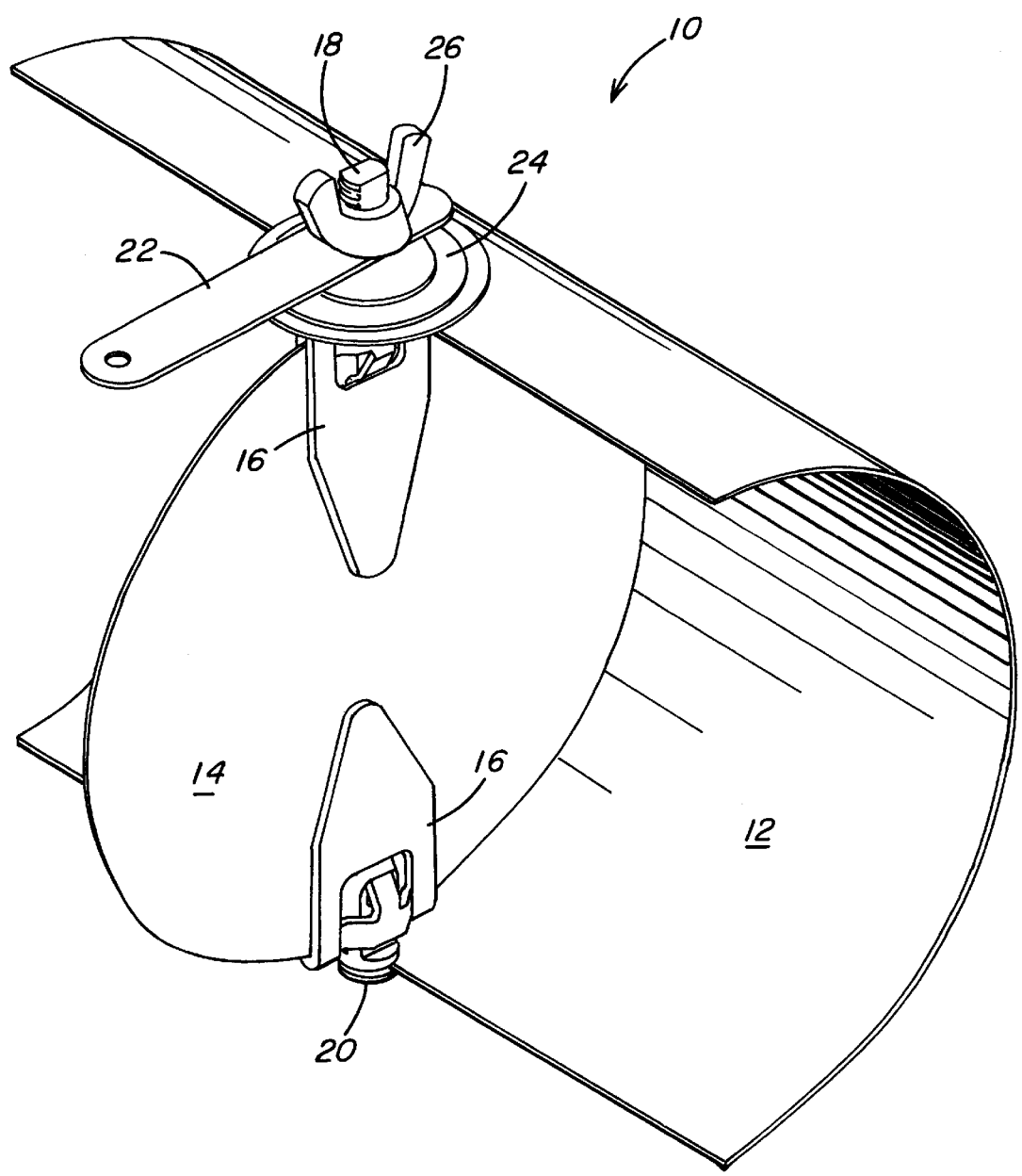
FIG. 1 is a perspective view in partial section of the damper mounting assembly of the present invention securing a damper blade within a duct.

Referring to the drawings, and particularly to FIG. 1, there is shown generally a damper assembly 10 utilizing the damper mounting assembly of the present invention positioned within a duct 12. The damper blade 14 has identical attachment clips 16 affixed to the damper blade 14 in axially opposite positions on the damper blade 14. Secured to the attachment clips 16 are a first shaft segment 18 and a second shaft segment 20.

A control handle 22 is affixed to the first shaft segment 18 with a cup washer 24 between the handle 22 and the duct 12. A lock nut 26 secures the handle 22 in the desired angular position by being threaded onto threads on shaft segment 18 and urging the control handle 22 against cup washer 24 which is in turn urged against the duct 12.

Figure 2:
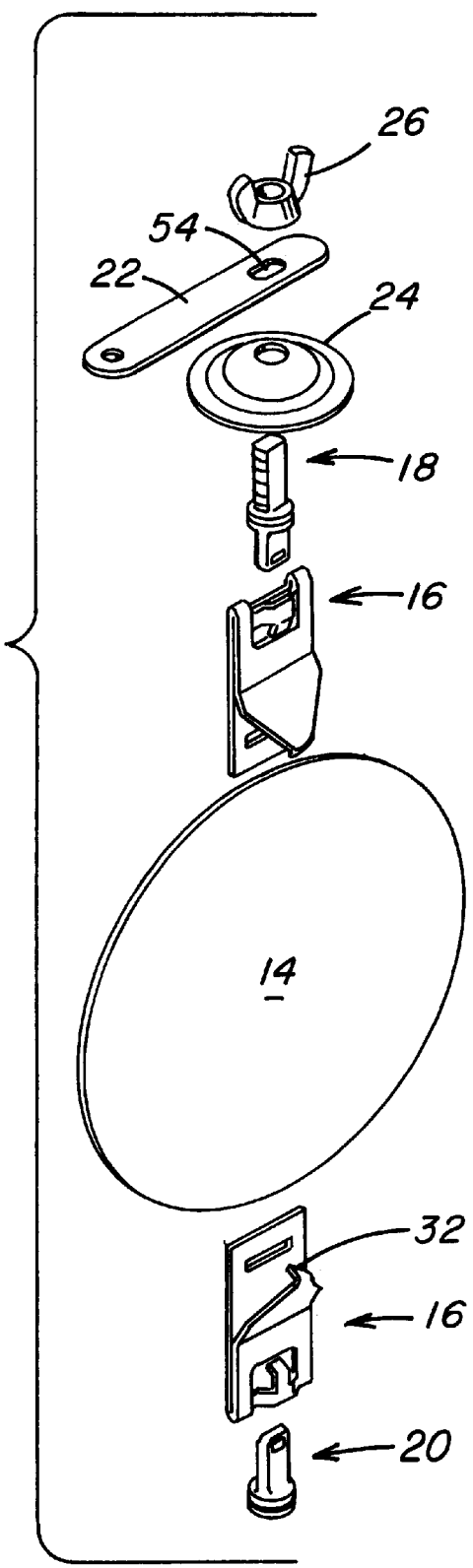
FIG. 2 is an exploded view of the damper hardware of the present invention including the damper blade and the damper mounting assembly.
Figure 3:
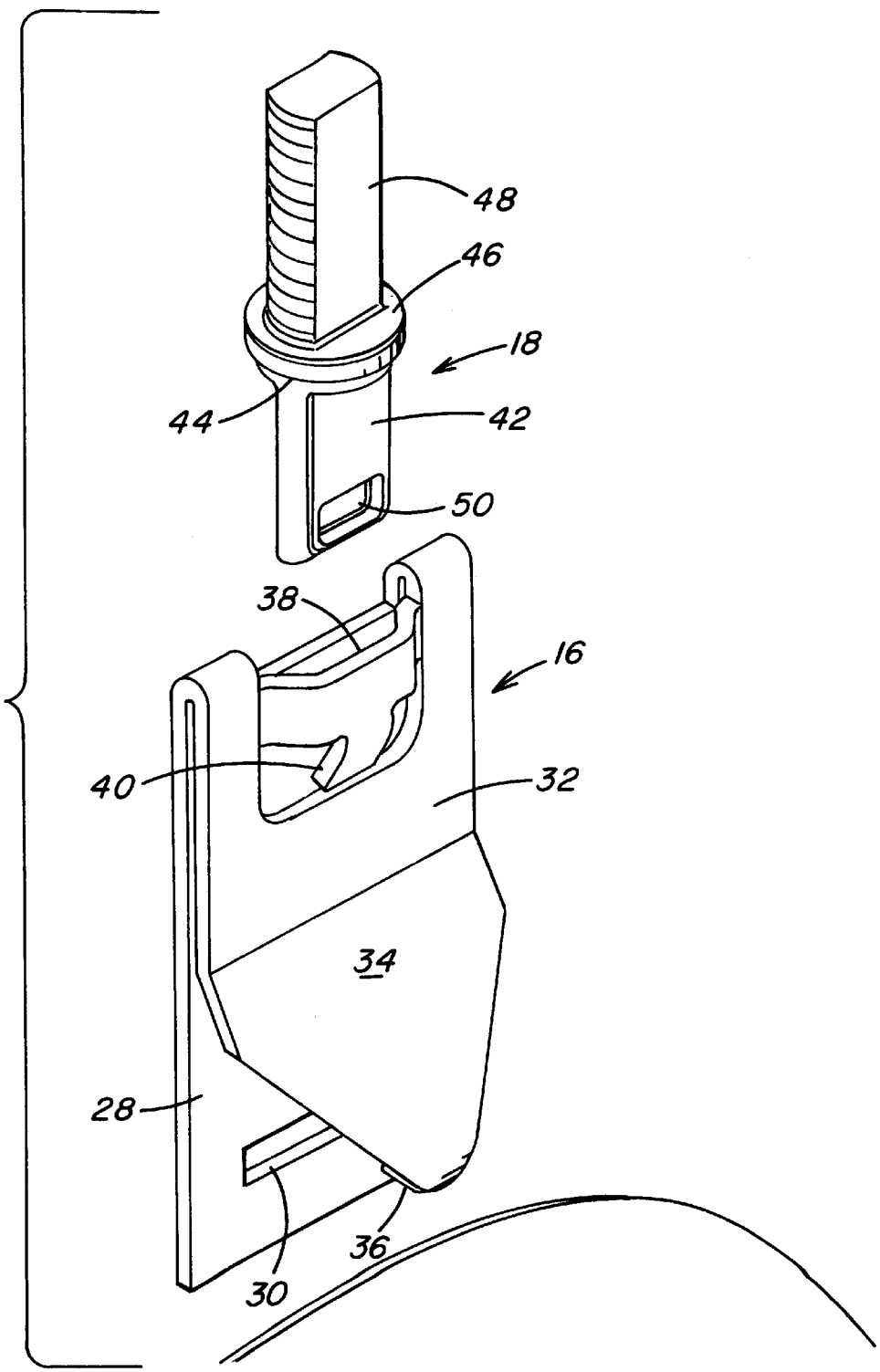
FIG. 3 is an exploded view similar to FIG. 2 showing an attachment clip and a shaft segment in greater detail.
Figure 4:
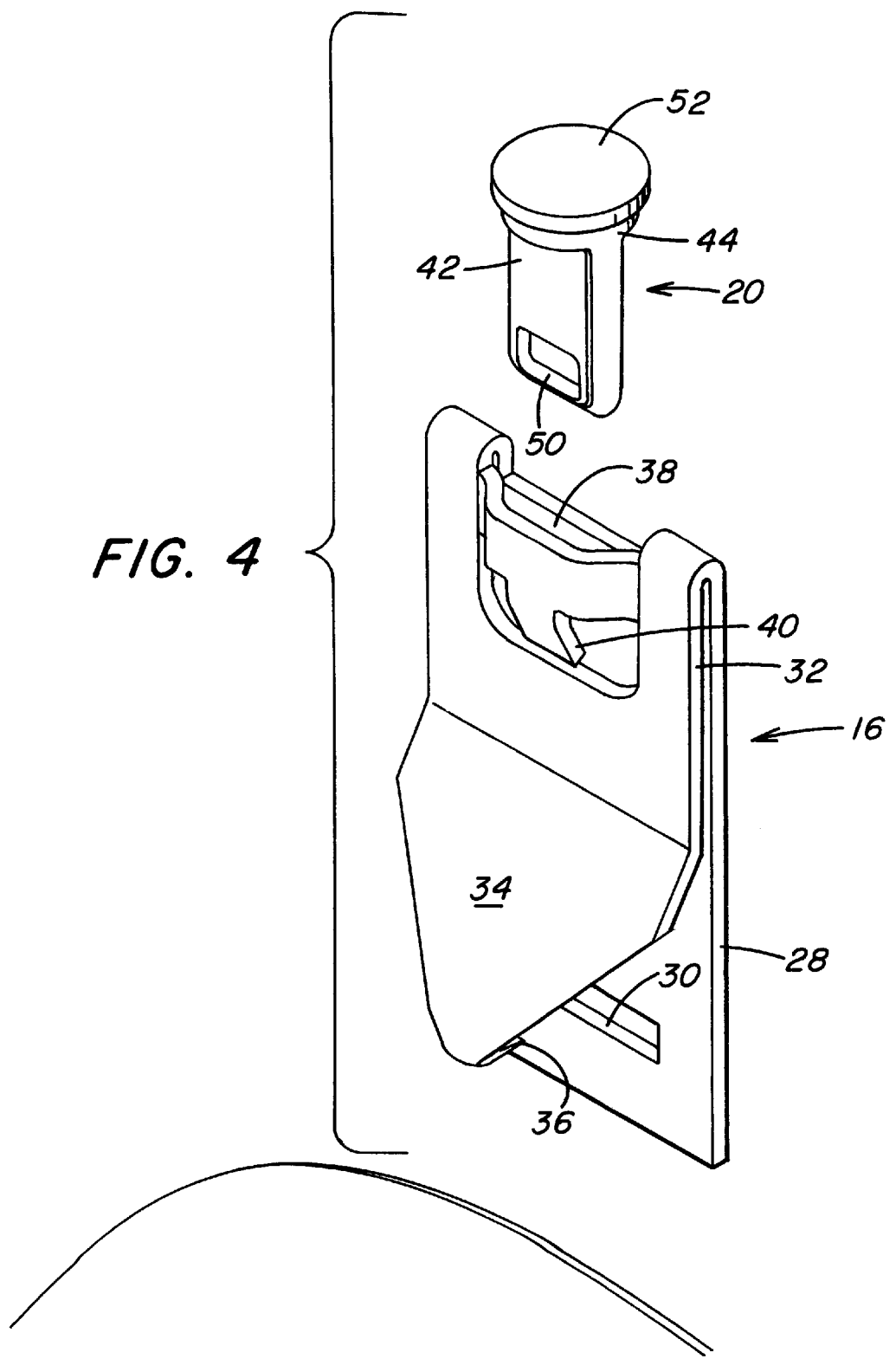
FIG. 4 is an exploded view similar to FIG. 3 again showing an attachment clip and a shaft segment in greater detail.

Referring to FIGS. 2, 3, and 4, additional details of the components of the damper mounting assembly are shown. As best seen in FIGS. 3 and 4, the attachment clips 16 are identical to each other and each have a base plate 28. The attachment clips 16 are preferably formed of galvanized sheet metal. An opening 30 in the base plate is provided for a purpose to be described. The attachment clips 16 also have top plates 32 which are formed by bending the base plate 28 back upon itself. A clamp section 34 is provided on top plate 32 and the clamp section 34 has a pointed end 36 (FIG. 2) such that the pointed end 32 will penatrate the damper blade 14 and will register with the opening 30 in base plate 28 if the clamp section 34 is flattened towards base plate 28. As seen in FIGS. 3 and 4, the four-sided shaft receiving opening 38 is formed between the base plate 28 and the top plate 32 near the position where the base plate 28 is folded over to form the top plate 32. A snap-in tongue 40 is formed to extend downwardly into the area below the four-sided shaft receiving opening 38. In order to attach the attachment clips 16 to the damper blade 14, the attachment clips are positioned on the damper blade with the damper blade extending between the base plate 28 and the top plate 32 of the attachment clips 16. The clamp section 34 of the attachment clips 16 is then struck with a hammer to drive the pointed end 36 through the damper blade 14 into the opening 30 in base plate 28 to thereby secure the attachment clips 16 to the damper blade 14.

Once the attachment clips 16 are fastened to the damper blade 14, shaft segments 18 and 20 are inserted through circular holes in the duct 12 and the ends of the shaft segments 18 and 20 are received within the four-sided shaft receiving openings 38 of the attachment clips 16. As best seen in FIG. 3, the shaft segment 18 has an interior end 42 that has a generally rectangular cross section 42. A cylindrical portion 44 is formed on the end 42 and an oversize cylindrical head portion 46 is formed above the cylindrical portion 44. Extending outwardly from the interior end 42, the cylindrical portion 44 and the oversize head portion 46 is a flattened threaded portion 48 which receives the control handle 22. At the interior end of the first shaft segment 18, a groove 50 is formed to register with the snap-in tongue 40 of attachment clips 16 when the interior end 42 of the first shaft segment 18 is inserted into the four-sided shaft receiving opening 38 of the attachment clips 16.

Referring to FIG. 4, it will be seen that the shaft segment 20 is similar to the lower portion of the shaft segment 18 just described in connection with FIG. 3. Similar reference numerals have been utilized to show the rectangular cross section interior end 42 of shaft segment 20, together with the cylindrical portion 44 and the grove 50. Shaft segment 20 has an oversize head 52.

To review the assembly of the damper and mounting assembly of the present invention, the attachment clips 16 are secured to the damper blade 14 by driving the pointed ends 36 of the attachment clips 16 through the damper blade 14. The damper blade 14 with the attachment clips 16 affixed thereto is positioned within the duct section 12. The shaft segments 18 and 20 are inserted through axially aligned holes in the duct 12. When so inserted, the generally rectangular interior end 42 of the shaft segments 18 and 20 enter into the four-sided shaft receiving openings 38 of the attachment clips 16 and are permanently secured within the attachment clips 16 when the snap-in tongue 40 registers with the appropriate groove 50 in shaft segments 18 and 20. The cylindrical portions 44 of shaft segments 18 and 20 are sized to fit closely within the axially aligned holes in the duct 12 to prevent leakage of the air from the duct through the holes that receive the shaft segments.

The oversize head portion 46 of first shaft segment 18 and the cylindrical head 52 of the second shaft segment 20 remain outside the duct 12 after assembly of the hardware as described. The control handle 22 has a rectangular hole 54 formed in it to slide over the flattened threaded portion 48 of shaft segment 18. With the flattened threaded portion 48 protruding out from the duct section 12, the cup washer 24 is positioned over flattened threaded portion 48, the handle 22 is positioned over the cup washer 24 and the lock nut 26 is threaded onto the flattened threaded portion 48. The damper blade is then positioned within the duct as dictated by the air flow requirements. After the damper blade is so positioned, the lock nut 26 is tightened to secure the damper blade 14 in its desired position.

According to the provisions of the patent statutes, I have explained that principle, preferred construction, and mode of operation of my invention and have illustrated and described what I now consider to represent its best embodiment. However, it should be understood that, within the scope of the appended claims, the invention may be practiced otherwise than as specifically illustrated and described.

I claim:

1. A damper mounting assembly comprising:

two attachment clips arranged to be affixed to axially opposite sides of a damper blade, each of said attachment clips having a non-cylindrical shaft receiving opening to permanently receive an interlocking non-cylindrical shaft segment that supports said damper blade within a duct;

first and second shaft segments each having an interlocking non-cylindrical interior end that permanently mates with said attachment clip non-cylindrical shaft receiving opening and a cylindrical portion that extends through the wall of said duct;

said first shaft segment having a control handle receiving portion for attaching a control handle for controlling the position of said damper blade within said duct; and, said second shaft segment having a head larger than said shaft segment cylindrical portion.

2. The damper mounting assembly of claim 1 wherein said attachment clips each have four-sided shaft receiving openings that have a snap-in tongue extending into said opening and said first and second shaft segments each have one rectangular end portion, each shaft segment rectangular end portion having a groove therein to receive said snap-in tongue to permanently secure said shaft segment to its respective attachment clip once said shaft segment rectangular end portion is inserted into said attachment clip rectangular shaft receiving opening.

3. The damper mounting assembly of claim 1 wherein said first and second shaft segment cylindrical portions are sized to fit into cylindrical holes within said duct wall to minimize pressure loss from said duct through said holes.

4. The damper mounting assembly of claim 1 wherein said damper blade with said attachment clips affixed to axially opposite sides is positioned within said duct and said first and second shaft segments are inserted through axially opposite holes in said duct from outside said duct and into said shaft receiving openings in said attachment clips.

5. The damper mounting assembly of claim 1 wherein said two attachment clips are identical to each other.

6. The damper mounting assembly of claim 1 wherein said first shaft segment has a flattened threaded portion extending axially outwardly from said cylindrical portion to receive a handle having a rectangular hole through which said flattened threaded portion passes.

7. The damper mounting assembly of claim 1 wherein said damper blade is circular and said duct has a circular cross section.

8. In combination, a damper blade and a damper mounting assembly for rotatably mounting said damper blade in a duct comprising;

a damper blade;

two attachment clips secured to axially opposite sides of said damper blade, said attachment clips each having a non-cylindrical shaft receiving opening to permanently receive an interlocking non-cylindrical shaft segment that rotatably supports said damper blade within said duct;

first and second shaft segments each having an interlocking non-cylindrical interior end that permanently mates with said attachment clip non-cylindrical shaft receiving opening and a cylindrical portion that extends through circular holes formed in axially opposite positions in said duct;

said first shaft segment having a control handle affixed to said shaft segment outside said duct for controlling the position of said damper blade within said duct; and said second shaft segment having a head larger than said shaft segment cylindrical portion that remains outside said duct.

9. The combination of claim 8 wherein said attachment clips each have four-sided shaft receiving openings that have a snap-in tongue extending into said openings and said first and second shaft segments each have one rectangular end portion having a groove therein to receive said snap-in tongue to permanently secure said shaft segment to its respective attachment clip once said shaft segment rectangular end portion is inserted into said attachment clip four-sided shaft receiving opening.

10. The combination of claim 8 wherein said damper blade is circular and said duct has a circular cross section.

11. In combination, a circular damper blade and a damper mounting assembly for rotatably mounting said circular damper blade in a duct having a circular cross-section comprising:

a circular damper blade;

two attachment clips secured to axially opposite sides of said damper blade, said attachment clips each having four-sided shaft receiving openings that have a snap-in tongue extending into said shaft receiving openings to permanently receive a shaft segment that rotatably supports said damper blade within said duct;

first and second shaft segments each having an interior rectangular end portion that has a groove therein to receive said snap-in tongue to permanently secure said shaft segment to its respective attachment clip once said shaft segment rectangular end portion is inserted into said attachment clip four-sided shaft receiving opening and said first and second shaft segments each having a cylindrical portion that extends through circular holes formed in axially opposite positions in said duct;

said first shaft segment having a flattened threaded portion extending axially outwardly from said cylindrical portion to receive a control handle for controlling the position of said damper blade within said duct; and said second shaft segment having a head larger than said shaft segment cylindrical portion that remains outside said duct.

12. The combination of claim 11 wherein said first and second shaft segment cylindrical portions are sized to fit into cylindrical holes within said duct wall to minimize pressure loss from said duct through said holes.

13. The combination of claim 11 wherein said circular damper blade with said attachment clips affixed to axially opposite sides is positioned within said circular duct and said first and second shaft segments are inserted through axially opposite holes in said duct from outside said duct and into said shaft receiving openings in said attachment clips.

14. The combination of claim 11 wherein said attachment clips are formed from galvanized sheet metal.

15. The combination of claim 11 wherein a cup washer is positioned on said first shaft segment flattened threaded portion outside said duct wall between said control handle and said duct wall and a lock nut is threaded onto said flattened threaded portion to lock said control handle and to lock said circular damper blade in the desired angular position within said duct.

* * * * *